United States Patent [19]
Rosenthal et al.

[11] 3,914,295
[45] Oct. 21, 1975

[54] CATALYTIC OXIDATION OF HYDROCARBONS WITH ORGANIC HYDROPEROXIDES

[75] Inventors: Rudolph Rosenthal, Broomall; Giovanni A. Bonetti, Wynnewood, both of Pa.

[73] Assignee: Atlantic Richfield Company, Los Angeles, Calif.

[22] Filed: Dec. 18, 1972

[21] Appl. No.: 316,185

[52] U.S. Cl. ..... 260/524 M; 260/618 C; 260/632 R; 260/610 R
[51] Int. Cl.² ......................................... C07C 51/33
[58] Field of Search ........ 260/524 M, 618 C, 632 R

[56] References Cited
UNITED STATES PATENTS

| | | | |
|---|---|---|---|
| 2,687,438 | 8/1954 | Lorand et al. | 260/618 C |
| 2,854,487 | 9/1958 | Quin | 260/618 C |
| 3,278,608 | 10/1966 | Champigny | 260/618 C |
| 3,558,687 | 1/1971 | Russell | 260/632 R X |

OTHER PUBLICATIONS

Karasch et al., J. of Org. Chem., Vol. 24, 1959, pp. 72–78.

Primary Examiner—Robert Gerstl
Assistant Examiner—Richard D. Kelly
Attorney, Agent, or Firm—Delbert E. McCaslin

[57] ABSTRACT

Method for the catalytic oxidation of methyl-substituted aromatic hydrocarbons using an organic hydroperoxide as the oxidizing agent in the presence of a metal salt catalyst, the metal being selected from the group consisting of vanadium, chromium, manganese, iron, cobalt, nickel and copper. The products of the reaction are principally carboxylic acids and the corresponding unsymmetrical peroxides which can be hydrogenated to alcohols.

2 Claims, No Drawings

{ 3,914,295 }

CATALYTIC OXIDATION OF HYDROCARBONS WITH ORGANIC HYDROPEROXIDES

BACKGROUND OF THE INVENTION

It is well-known to oxidize hydrocarbons to carboxylic acids utilizing air oxidation in the vapor phase or in the liquid phase at relatively high temperatures and pressures. Alternatively the usual method for the preparation of the hydroxy methyl aromatic compounds for example benzyl alcohol from a methyl-substituted hydrocarbon, such as toluene involves chlorination of the side chain to prepare benzyl chloride followed by hydrolysis with a base to benzyl alcohol and sodium chloride. In this process the chlorine used is converted to salt and hydrogen chloride which presents disposal problems. Therefore, a method for the synthesis of benzyl alcohol without involving the problems associated with a chlorination reaction whereby the chlorine is converted to undesirable products is a desirable objective.

The process of the instant invention provides a method for the oxidation of hydrocarbons by chemical means to produce carboxylic acids using readily available hydroperoxides, a relatively low temperature and pressure in the presence of a metal salt catalyst while at the same time there is also formed the unsymmetrical hydrocarbyl peroxide which by simple catalytic hydrogenation is converted to the desired alcohol corresponding with the hydrocarbon starting material and the alcohol corresponding to the hydroperoxide employed. The acids and alcohols produced by the process of this invention have a great many commercial uses.

In an article by Kharasch and Fono in the *Journal of Organic Chemistry*, Vol. 74, page 72, 1959, there is reported the reaction of para-xylene with tertiary butyl hydroperoxide and cuprous chloride at 50° C. These investigators however, did not report the formation of any carboxylic acids. The present invention differs therefrom in that higher temperatures are employed to produce the carboxylic acids and the unsymmetrical peroxides which in turn can be catalytically hydrogenated to produce the alcohols. In addition the instant invention shows the generic concept with respect to the various hydrocarbons, organic hydroperoxides and catalysts as well as reaction conditions which can be employed in the process of this invention.

SUMMARY OF THE INVENTION

In accordance with the process of this invention methyl-substituted aromatic hydrocarbons including mono-, di-, and poly-methylated aromatics as well as methyl-substituted polynuclear aromatics are oxidized with secondary or tertiary alkyl, cycloalkyl, or aralkyl hydroperoxides at temperatures in the range of from 60° C. to 110° C. in the presence of a catalytic amount of a salt of a metal selected from the group consisting of metals having atomic numbers in the range of from 23 to 29 inclusive of the Periodic Table, i.e. vanadium, chromium, manganese, iron, cobalt, nickel and copper. The oxidation reaction produces carboxylic acids together with the unsymmetrical peroxides, the latter being capable of catalytic reduction to corresponding alcohols having highly useful properties. This process avoids the problems of prior art processes in that it produces fewer by-products and no by-products which present disposal problems.

It is an object of this invention therefore to provide a method for the catalytic oxidation of methyl-substituted aromatic hydrocarbons utilizing an organic hydroperoxide as the sole oxidizing agent to produce the corresponding carboxylic acids.

It is another object of this invention to provide a method for the catalytic oxidation of methyl-substituted aromatic hydrocarbons utilizing an organic hydroperoxide as the sole oxidizing agent to produce a mixture of the corresponding carboxylic acid and unsymmetrical peroxide.

It is another object of this invention to provide a method for the production of carboxylic acids and alcohols by the catalytic oxidation of methyl-substituted aromatic hydrocarbons utilizing an organic hydroperoxide as the sole oxidizing agent to produce a mixture of the carboxylic acid corresponding to the methyl-substituted aromatic and the unsymmetrical hydrocarbon peroxide which is thereafter catalytically reduced to the alcohol corresponding to the aromatic hydrocarbon and the hydroperoxide employed.

Other objects of this invention will be apparent from the detailed description thereof which follows and from the claims.

DESCRIPTION OF THE INVENTION

The hydrocarbons which can be oxidized by the method of this invention are the methyl-substituted, either mono-, di- or poly-substituted benzenes, naphthalenes, anthracenes, phenanthrenes, biphenyls, terphenyls and like aromatic hydrocarbons. Those hydrocarbons which are solids at reaction temperatures, such as the methyl-substituted anthracenes and terphenyls can be dissolved in hot benzene and oxidized in the liquid phase in solution. In general hydrocarbons having no more than three aromatic rings are preferred, but either one or all of the rings may be substituted with one or more methyl groups. The hydrocarbons also may be substituted by other functional groups, such as acid, ester, hydroxy and the like provided these groups do not react with the hydroperoxides.

The organic hydroperoxides which can be employed in this invention as the oxidizing agent are the secondary and tertiary alkyl, cycloalkyl or aralkyl hydroperoxides, such as tertiary butyl hydroperoxide, tertiary amyl hydroperoxide, cumene hydroperoxide diisopropyl benzene mono- or di-hydroperoxides, cyclohexyl hydroperoxides, phenylethyl hydroperoxide (ethylbenzene hydroperoxide) tetralin hydroperoxide, diisopropyl ketone hydroperoxide, and the like. In general it is preferred that the hydroperoxide contain from 4 to 12 carbon atoms since these are most readily available. These hydroperoxides are produced commercially by simple oxidation of the corresponding hydrocarbon with molecular oxygen and the crude oxidate, partially purified hydroperoxide or purified hydroperoxide may be used provided that the impurities which are allowed to remain in the hydroperoxide are not further oxidized to contaminate the product.

The temperature of the reaction is preferably in the range of from 60° C. to 110° C. with from 80° C. to 105° C. being somewhat more preferred, temperatures above 110° C. although operable are not preferred since most organic hydroperoxides decompose thermally at these temperatures and thus tend to give lower yields of the desired products. Pressures may be atmospheric, sub-atmospheric or super-atmospheric, super-atmospheric pressure being employed with the lower boiling compounds when temperatures at the high end of the range are being used in order to maintain a liquid phase reaction mixture.

The concentrations of the reactants may vary over a wide range and are not critical, however, it is generally preferred to employ a stoichiometric molar excess of the hydrocarbon over the organic hydroperoxide in order to avoid mere thermal decomposition of the latter compound which would add to the cost of the process. Ordinary catalytic concentrations of the catalyst are employed and in general the concentrations of the catalyst may vary from about 0.01 weight percent to about 2 weight percent, preferably from about 0.5 weight percent to 1 weight percent based on the total weight of the reaction mixture. As pointed out, inert solvents, such as benzene or t-butanol may be employed particularly if the hydrocarbon is a solid at the reaction temperature, otherwise the use of such solvent is not essential.

The catalysts are metal salts of the above-mentioned elements 23–29 inclusive, i.e. vanadium, chromium, manganese, iron, cobalt, nickel and copper, the salts may be either organic or inorganic, such as the naphthenates, acetylacetonates, halides, sulfates and the like. Since hydroperoxides act as both oxidizing and reducing agents toward metals the salts employed may have the metal in any of its oxidation states. The reaction times may vary from a few minutes to several hours depending upon the catalyst type and amount, reaction temperature and the particular hydroperoxide employed. It is, of course, possible to separate both the unreacted hydrocarbon hydroperoxide and the catalyst from the reaction product mixture by conventional methods and recycle any or all of such materials together with desired make-up reagents.

The carboxylic acid and the unsymmetrical peroxide produced are separated as will be described more fully hereinafter in the Examples and the peroxides can be converted to the alcohols utilizing hydrogen and the usual hydrogenation catalysts, such as nickel, platinum, and palladium, preferably supported, for example, on carbon. The hydrogenation of the peroxide can be carried out in inert solvents, if desired, and in general pressures in the range of from 5 to 5000 psig can be employed at temperatures ranging from about 25° C. to 200° C. or more. The following Examples are provided for illustrating the invention in additional detail. Although these Examples are batch reactions as convenient in laboratory scale runs the process is obviously amenable to continuous operation by conventional engineering.

EXAMPLE I

Oxidation of Toluene to Benzoic Acid and Benzyl Alcohol

A mixture of 92 g toluene, 25 g t-butyl hydroperoxide (dried over mole sieves) and 0.1 g cuprous chloride was charged to a 500 ml round bottom flask and heated with stirring at 85° C. for 4 hours. A sample of the reaction mixture analyzed 6.15 weight percent t-butyl hydroperoxide. The mixture was stripped of lower volatility products in a flash evaporator at 45°–50° C. under reduced pressure. n-Pentane was added to the residue which was filtered after cooling in ice water. The solid was recrystallized from water. The product melted at 122° C. and showed no depression of the melting point when mixed with an authentic sample of benzoic acid. The filtrate was stripped of n-pentane and the residue separated on a silica gel column using chloroform as the eluting solvent. After removal of the solvent the product was identified by nuclear magnetic resonance spectroscopy (nmr) as benzyl t-butyl peroxide. Four grams of this material was dissolved in 50 ml t-butanol, 1 ml conc. HCl added, and the mixture reduced with 0.5 g 10 weight percent Pd/C catalyst at a hydrogen pressure of 60 psig at room temperature. The product was filtered and it was found by nmr and gas-liquid phase chromatographic (glpc) analysis that the peroxide had been converted to benzyl alcohol and t-butanol.

EXAMPLE II

Oxidation of p-Xylene to p-Toluic Acid

A mixture of 106 g p-xylene, 25 g t-butyl hydroperoxide (dried over mole sieves) and 0.1 g cuprous chloride was charged to a 500 ml round bottom flask and heated with stirring at 85° C. for 4 hours. Titration showed that 4.75 weight percent t-butyl hydroperoxide remained based on the weight of the reaction mixture. The product was stripped of volatile materials in a flash evaporator under reduced pressure. n-Pentane was added to the residue and filtered after cooling in ice water. The solid melted at 176°–179° C. and was identified as p-toluic acid. The filtrate after removal of the n-pentane was found to contain 4-methylbenzyl t-butyl peroxide. This can be hydrogenated to 4-methylbenzyl alcohol, or can be oxidized by further treatment with t-butyl hydroperoxide and cuprous chloride to p-toluic acid and terephthalic acid.

EXAMPLE III

Oxidation of p-Toluic Acid to Terephthalic Acid

A mixture of 13.6 g p-toluic acid, 100 g benzene, 0.1 g cuprous chloride and 8 g dry t-butyl hydroperoxide was heated with stirring at 77° C. for 3½ hours. Analysis for t-butyl hydroperoxide showed that 1.09 weight percent remained based on the weight of the reaction mixture. The reaction mixture was cooled and filtered, and the filter cake esterified with methanol. Glpc analysis of the esters showed the presence of methyl-p-toluate and dimethyl terephthalate.

EXAMPLE IV

Oxidation of p-Xylene to p-Toluic Acid and Terephthalic Acid

A mixture of 10.6 g p-xylene, 50 g benzene, 0.1 g cuprous chloride and 27 g dry t-butyl hydroperoxide was heated at reflux for 5 hours and the mixture concentrated on a flash evaporator under reduced pressure. n-Pentane was added to the residue and filtered after cooling in ice water. Glpc analysis of the methyl esters prepared from the filter cake showed the presence of both p-toluic acid and terephthalic acid in the original filter cake.

EXAMPLE V

Oxidation of 2-Methyl Naphthalene to 2-Naphthoic Acid

A mixture of 14.2 g 2-methyl naphthalene, 0.1 g cuprous chloride and 6 g dry t-butyl hydroperoxide was heated with stirring. The reaction was exothermic and the temperature reached 105° C. The mixture was cooled to 85° C. and heated at that temperature for 2 hours at which time it was found that 2.4 weight percent t-butyl hydroperoxide remained based on the weight of the reaction mixture. After removal of volatile products in a flash evaporator at reduced pressure, n-pentane was added and the residue cooled in ice water. The solids were filtered and recrystallized from benzene and had a melting point of 185°–186° C. This was identified as 2-naphthoic acid. After stripping the n-pentane from the filtrate 2-naphthyl-methyl t-butyl peroxide was identified as a reaction product. This can be hydrogenated to 2-hydroxymethyl naphthalene and t-butanol.

EXAMPLE VI

Oxidation of 1-Methyl Naphthalene to 1-Naphthoic Acid

Substituting 1-methyl naphthalene for the 2-methyl naphthalene in Example V gave a solid melting at 159°–160° C. This was identified as 1-naphthoic acid. The corresponding 1-naphthylmethyl t-butyl peroxide was found in the filtrate.

EXAMPLE VII

Cumene Hydroperoxide

A mixture of 53 g p-xylene, 0.2 g cuprous chloride and 25 g 81 weight percent cumene hydroperoxide was heated at 85° C. to 138° C. for one hour. Volatile products were removed in a flash evaporator at reduced pressure and the residue extracted with 10 weight percent sodium hydroxide solution. Acidification with hydrochloric acid gave a solid identified as p-toluic acid.

EXAMPLE VIII t-Amyl Hydroperoxide

A mixture of 46 g toluene, 0.1 g cuprous chloride and 12 g 71 weight percent t-amyl hydroperoxide was heated at 85° C. for 1 hour and then at 95° C. for 2 hours. Titration showed 3.6 weight percent t-amyl hydroperoxide remaining based on the weight of the reaction mixture. The volatile products were removed in a flash evaporator at reduced pressure and the residue extracted with 10 weight percent sodium hydroxide solution. Acidification with hydrochloric acid gave a solid identified as benzoic acid.

EXAMPLE IX

Cobalt Catalyst

A mixture of 92 g toluene and 25 g t-butyl hydroperoxide was heated to 75° C. A solution of 0.3 g, 6 weight percent cobalt (as naphthenate) in 35 g toluene was added over a 6 hour period with the temperature maintained at about 90° C. At the end of this period 5.5 weight percent t-butyl hydroperoxide remained based on the weight of the reaction mixture. After removal of the volatile products under reduced pressure the residue was treated with n-pentane, cooled and filtered. The solid, 1.36 g, had a melting point of 121°–122° C. after recrystallization from water and was identified as benzoic acid.

EXAMPLE X

Manganese Catalyst

In a manner similar to Example IX with the exception that 0.5 g of a 6 weight percent manganese (as naphthenate) was employed benzoic acid was obtained as a reaction product.

EXAMPLE XI

Iron Catalyst

In a manner similar to Example IX with the exception that 0.5 g of 6 weight percent iron (as naphthenate) was employed as catalyst, benzoic acid was recovered from the reaction mixture.

EXAMPLE XII

Nickel Catalyst

Substitution of 0.9 g 6 weight percent nickel (as naphthenate) as the catalyst in Example IX also gave benzoic acid as a reaction product.

EXAMPLE XIII

Chromium Catalyst

Substitution of the catalyst in Example IX by 0.3 g of a 3.8 weight percent chromium (as naphthenate) gave 1.59 g of benzoic acid.

EXAMPLE XIV

Vanadium Catalyst

Substitution of the catalyst of Example IX by 0.3 g of a 3.0 weight percent vanadium (as naphthenate) gave 1.76 g benzoic acid.

EXAMPLE XV

Molybdenum Catalyst (Not operative in this invention.)

When 0.3 g of 5 weight percent molybdenum (as naphthenate) was substituted for the catalyst of Example IX no benzoic acid was found in the product showing that although molybdenum decomposes the hydroperoxide it is not effective for the production of carboxylic acids from hydrocarbons.

EXAMPLE XVI

Titanium Catalyst (Not operative in this invention)

When 0.6 g of 3 weight percent titanium (as naphthenate) was substituted for the catalyst of Example IX no benzoic acid was found in the product and very little decomposition of the hydroperoxide occurred at 95° C.

In addition to the hydrocarbons shown in the foregoing examples, the method of this invention is applicable to all those set forth generically in the description including, for example, the isomeric xylenes; the trimethylbenzenes such as mesitylene (1,3,5-trimethylbenzene), pseudocumene (1,2,4-trimethylbenzene) and hemimellitene (1,2,3-trimethylbenzene); the tetramethylbenzenes such as durene (1,2,4,5-tetramethylbenzene); the dimethylnaphthalenes such as alpha-dimethylnaphthalene (1,4-dimethylnaphthalene) and guaiene (2,3-dimethylnaphthalene); the trimethylnaphthalenes such as the 1,2,5-trimethyl-, the 1,2,6-trimethyl-; the 1,2,7-trimethyl- and the 2,3,6-trimethyl-; the methyl anthracenes such as the 1-methyl-, the 2-methyl- and the 9-methyl-, the dimethylanthracenes such as the 1,3-dimethyl- and the 2,3-dimethyl-; the methylphenanthrenes such as the 1-methyl- and 3-methyl-; the dimethylphenanthrenes such as 4,5-dimethyl-; the methylbiphenyls such as 2-methyl-, 3-methyl- and 4-methyl-, the dimethyl- biphenyls such as 0,0'-bitolyl (2,2'- dimethyl-), the 2,3'-dimethyl-, the 2,4'-dimethyl-, m,m'-bitolyl (3,3'-dimethyl-) and p,p'-bitolyl (4,4-dimethyl-); the methyl-ortho-terphenyls, the methyl-meta-terphenyls and the methyl-para-terphenyls.

We claim:

1. A method for the catalytic oxidation of methyl substituted aromatic hydrocarbons which consists essentially of contacting said hydrocarbon selected from the group consisting of toluene, para-xylene, 1-methyl naphthalene and 2-methyl naphthalene at a temperature in the range of from 80°C. to 105°C. with an organic hydroperoxide selected from tertiary butyl hydroperoxide, cumene hydroperoxide and tertiary amyl hydroperoxide and in the presence of a catalyst selected from cuprous chloride, cobalt naphthenate, chromium naphthenate and vanadium naphthenate to produce a mixture of carboxylic acid and unsymmetrical hydrocarbon peroxide, separating the carboxylic acid and unsymmetrical hydrocarbon peroxide into the acid and peroxide components and catalytically hydrogenating the peroxide with a metal hydrogenation catalyst selected from the group consisting of nickel, platinum and palladium hydrogenation catalyst under hydrogen pressures in the range of 5 to 5000 psig and at a temperature in the range of from 25°C. to 200°C. to produce the alcohol corresponding to the hydrocarbon oxidized and the alcohol corresponding to the hydroperoxide employed.

2. The method according to claim 1 wherein the hydrocarbon employed is toluene, the hydroperoxide is tertiary butyl hydroperoxide, the acid produced is benzoic acid, the unsymmetrical hydrocarbon peroxide produced is benzyl tertiary butyl peroxide, and the peroxide is hydrogenated with hydrogen at about 60 psig and 25°C. in the presence of a palladium on carbon catalyst to produce benzyl alcohol and tertiary butanol.

* * * * *